United States Patent [19]

Okamoto et al.

[11] Patent Number: 4,945,426
[45] Date of Patent: Jul. 31, 1990

[54] HELICAL SCAN TRACKING SYSTEM

[75] Inventors: Hiroshi Okamoto, Nara; Souichirou Fujioka, Sakai, both of Japan

[73] Assignee: Matsushita Electric Industrial Co., Ltd., Osaka, Japan

[21] Appl. No.: 200,373

[22] Filed: May 31, 1988

[30] Foreign Application Priority Data

May 29, 1987 [JP] Japan .................. 62-135247

[51] Int. Cl.⁵ .................. G11B 5/52; G11B 15/467
[52] U.S. Cl. .................. 360/70; 360/73.11; 360/73.14; 360/77.14
[58] Field of Search .................. 360/10.1–10.3, 360/70, 75, 73.01, 73.04, 73.06, 73.08–73.14, 77.13–77.17; 318/6, 7

[56] References Cited

U.S. PATENT DOCUMENTS 3,838,453  9/1974  Buslik et al. .................. 360/70
4,599,660  7/1986  Kozuki et al. .................. 360/77.14

Primary Examiner—Vincent P. Canney
Assistant Examiner—Steven R. Garland
Attorney, Agent, or Firm—Wenderoth, Lind & Ponack

[57] ABSTRACT

A tracking system for a helical scanning type magnetic recording/reproducing apparatus which records and reproduces signals by a rotating magnetic head in which a tracking error signal is detected, and the feeding amount of the magnetic tape is controlled by a transfer section to accomplish tracking. The transfer of the magnetic tape is controlled so that the average transfer speed of the magnetic tape becomes a specified speed during a period when the rotating magnetic head does not reproduce signals. In particular, the tracking error signal is separated into low band and high band frequency components by a band separating circuit. A first transfer section is controlled by the low band frequency component to accomplish average tracking, and a second transfer section is controlled by the high band frequency component thereby changing the length of the magnetic tape between the rotating drum and the first transfer section. At the same time, while the rotating magnetic head does not reproduce signals, the second transfer section is controlled so that the tracking error signal becomes zero during the initial stage when the rotating magnetic head scans over the recorded track thereby to accomplish more stable tracking.

5 Claims, 7 Drawing Sheets

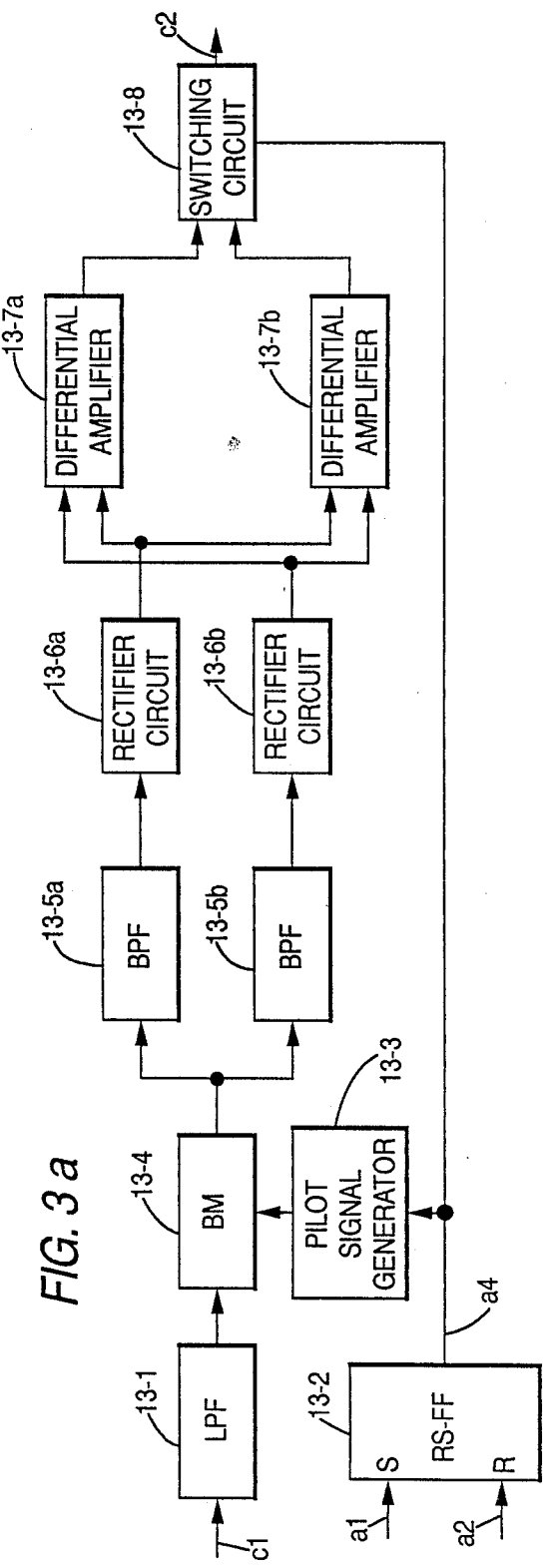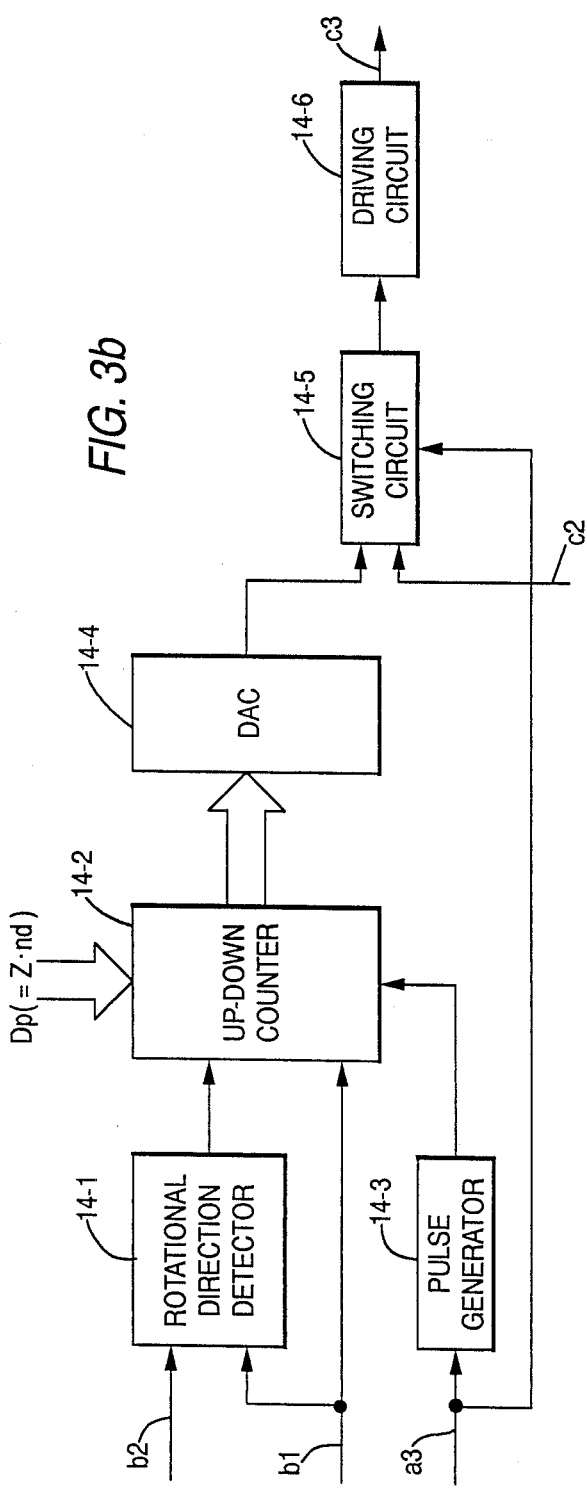
FIG. 3a
FIG. 3b

HELICAL SCAN TRACKING SYSTEM

BACKGROUND OF THE INVENTION

1. Field of the Invention The present invention relates to a tracking system for a magnetic recording/reproducing apparatus of helical scanning type.

2. Description of the Prior Art

In a magnetic recording/reproducing apparatus used for recording and reproducing video signals such as a VTR, recording of very fine video signals and digital recording of NTSC signals have recently been under study. Since these signals require a drastically large amount of information to be recorded compared with the analog NTSC signals, high density recording is wished strongly. As a means to achieve high density recording, there are a method in which the wave length to be recorded on a magnetic tape is reduced and a method in which the track width of a recording track to be formed on a magnetic tape is narrowed However, when the recording track width is narrowed in order to improve the recording density, if a reproducing apparatus is different from a recording apparatus, the scanning locus of the rotating magnetic head becomes different due to mechanical errors and the like between the apparatuses, so that it becomes difficult for the rotating magnetic head to accurately scan over the recording track during reproduction, making it impossible to achieve reproduction of video signals with good S/N.

In order to solve the above problem, a conventional system in which a rotating magnetic head and a piezo-electric element are constructed as an integral component and the piezo-electric element is driven during reproduction according to a tracking error signal so as to cause the rotating magnetic head to be displaced in the track width direction thereby causing the rotating magnetic head to accurately scan over recording tracks.

In a conventional system such as above, there are the following problems. (1) A brush and a slip ring for supplying driving power to a rotating piezo-electric element must be constructed on a rotary drum. Precious metals must be used for the contacting part of the brush and the slip ring in order to secure reliability, which inevitably increases cost of the apparatus. Also because the brush and the slip ring are to be provided on the rotary drum the height of the rotary drum will be increased and it becomes difficult to realize a thin magnetic recording/ reproducing apparatus. (2) Generally, to achieve highly accurate tracking, the rotating head must be controlled accurately in the order to several microns, but it is difficult to realize highly accurate tracking because of the drifting distortion inherent to the piezo-electric element. (3) It is very difficult to cause the head to be displaced in a direction parallel to the direction of the track width. For this reason, the space between the head and the tape is increased, so that the reproduced output of a short wave signal in particular is lowered.

In order to solve the above problems of the conventional system, a system is proposed in which the longitudinal position of the magnetic tape is made to be variable without causing the rotating head to be displaced. (Japanese Laid-Open Patent Applications No. 60-175240 (1985), and No. 60-185244 (1985)) In this system, only a tape running mechanism arranged with a means which makes the tape position variable between a rotating magnetic head and a capstan, is used. Though this system employs an effective means to make the longitudinal position of the magnetic tape to be variable thereby causing the rotary magnetic head to scan accurately over the recording track, there still remains a number of problems before realizing such system as a magnetic recording/reproducing apparatus.

SUMMARY OF THE INVENTION

An object of the present invention is to provide a tracking system of a magnetic recording/reproducing apparatus in which the rotating magnetic head is capable of scanning accurately over the recording track by controlling the longitudinal position of the magnetic tape on the rotating drum.

In order to achieve the above object, a tracking system of a magnetic recording/reproducing apparatus of helical scanning type according to the present invention wherein a rotating magnetic head scans over a magnetic tape arranged on a rotating drum during $\theta_w$ degrees (where $\theta_2 < \theta_p$) every time the rotating drum rotates $\theta_p$ degrees so as to record or reproduce signals, comprises: a tension control means which controls the tension of the magnetic tape; a tape transfer means which transfers the magnetic tape in its longitudinal direction; a transfer amount detection means which detects the transfer amount in the longitudinal direction of the magnetic tape; a tracking error detection means which detects a positional error of the scanning position of the magnetic head as a tracking error signal from a signal reproduced by the magnetic head with respect to the record track formed on the magnetic tape; and a control means which controls the tape transfer means according to the tracking error signal so that the magnetic head scans over the recorded track formed on the magnetic tape during a first period wherein the magnetic head reproduces signals recorded on the magnetic tape and controls the tape transfer means according to an output of the transfer amount detection means so that the transfer amount of the magnetic tape to be transferred every time the magnetic head rotates $\theta_p$ degree becomes a specified transfer amount during a second period other than the first period.

According to the above-mentioned arrangement, because (1) the transfer amount of the magnetic tape is controlled by the output of the tracking error detection means during a period wherein the rotating magnetic head reproduces signals and (2) the transfer amount of the magnetic tape is controlled so that the average transfer amount becomes a specified transfer amount during a period wherein signals are not reproduced, it becomes possible to cause the rotating magnetic head to accurately scan over the specified recorded track. As stated above, by controlling the transfer of the magnetic tape, the transfer amount of the magnetic tape is changed substantially causing variation in tension to be generated, and by controlling the tape tension at the rotating drum to be constant by a tension control means, it becomes possible to stably maintain the contacting condition between the rotating magnetic head and the magnetic tape. Thus it is possible to always obtain good reproduced signals.

BRIEF DESCRIPTION OF THE DRAWINGS

FIG. 3(a) is a detailed block diagram of a tracking error detection circuit in FIG. 3.

FIG. 3(b) is a detailed block diagram of a control section in FIG. 3.

DESCRIPTION OF THE PREFERRED EMBODIMENTS

Figure 1:
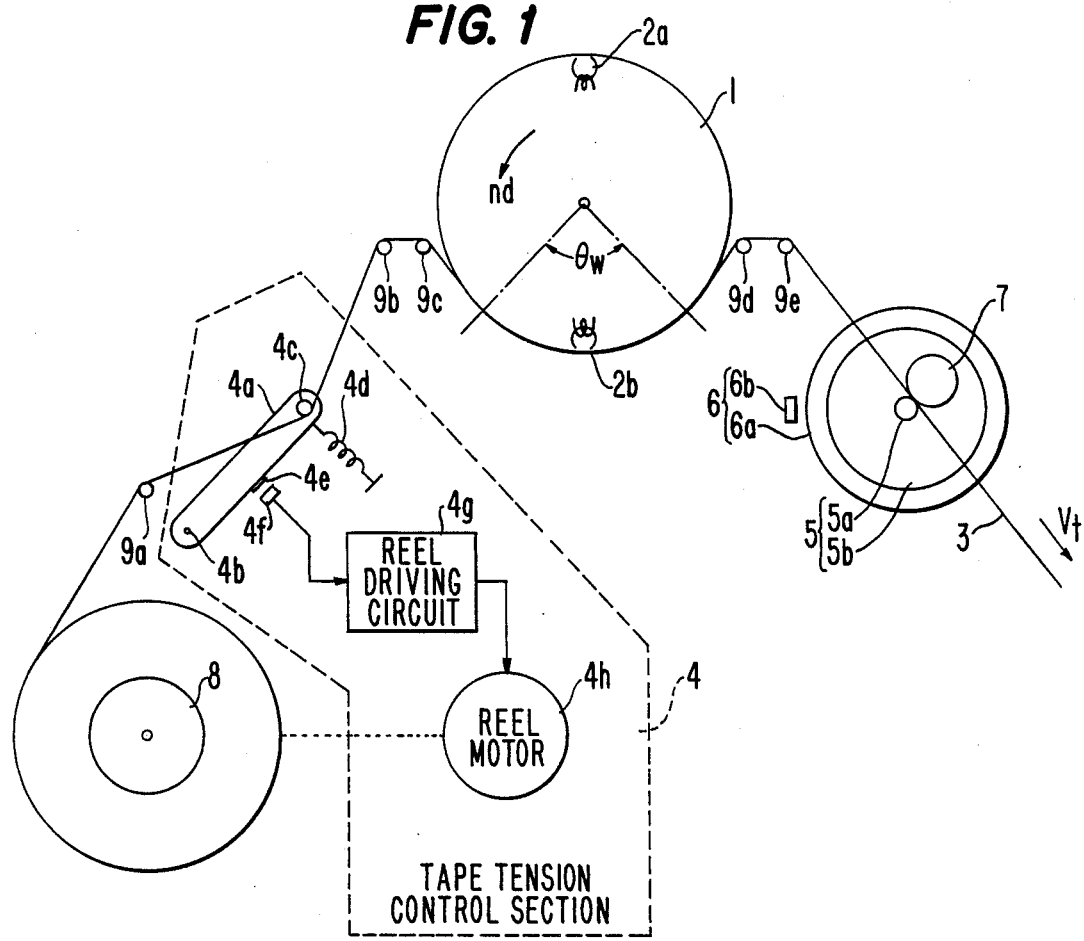
FIG. 1 is a block diagram showing a tape running system of a first embodiment.

FIG. 1 is a block diagram showing a schematic diagram of a tape running system of a helical scanning type magnetic recording/reproducing apparatus according to the first embodiment of the present invention.

In FIG. 1, a rotating drum 1 is controlled so that it rotates at a constant speed $n_d=30$[rps] during both recording and reproducing. Heads 2a, 2b are rotating magnetic heads having head width of $H_w$[μm] and mutually different gap azimuth alignments and are arranged on the rotating drum 1 at interval of $\theta_p$ (180°).

A tension lever 4a is provided with a tension post 4c on one end thereof and composed to be rotatable about the other end 4b as a fulcrum. The tension lever 4a is provided with a spring 4d to provide a rotating force via the tension post 4c to oppose the rotating force based on the tension of the magnetic tape 3. A magnet 4e is provided on the rotating part (almost the central position between the fulcrum 4b and the tension post 4c) of the tension lever 4a. A magnetism sensing element 4f is arranged at a fixed section opposing the magnet 4e. The magnetism sensing element 4f outputs a voltage corresponding to a magnetic flux.

Because the tension lever 4a rotates in the clockwise (CW) direction by the force of the spring 4d, the gap between the magnet 4e and the magnetism sensing element 4f becomes small, so that the output voltage of the magnetism sensing element 4f increases.

As the tape tension increases, the tension lever 4a rotates in the counterclockwise (CCW) direction so that the gap between the magnet 4e and the magnetism sensing element 4f becomes large, causing the output voltage of the magnetism sensing element 4f to decrease.

A reel driving circuit 4g supplies power corresponding to the output voltage of the magnetism sensing element 4f to a reel motor 4h which is composed to directly drive a reel 8. That is, the reel driving circuit 4g supplies power to the reel motor 4h so that the tape tension increases as the output voltage of the magnetism sensing element 4f increases and supplies power to the reel motor 4h so that the tape tension decreases as the output voltage of the magnetism sensing element 4f decreases.

Therefore, a tape tension control section 4 composed of the tension lever 4a, tension post 4c, spring 4d, magnet 4e, magnetism sensing element 4f, reel driving circuit 4g, and reel motor 4h operates to always maintain the tension of the magnetic tape 3 at a constant value.

Figure 1A:
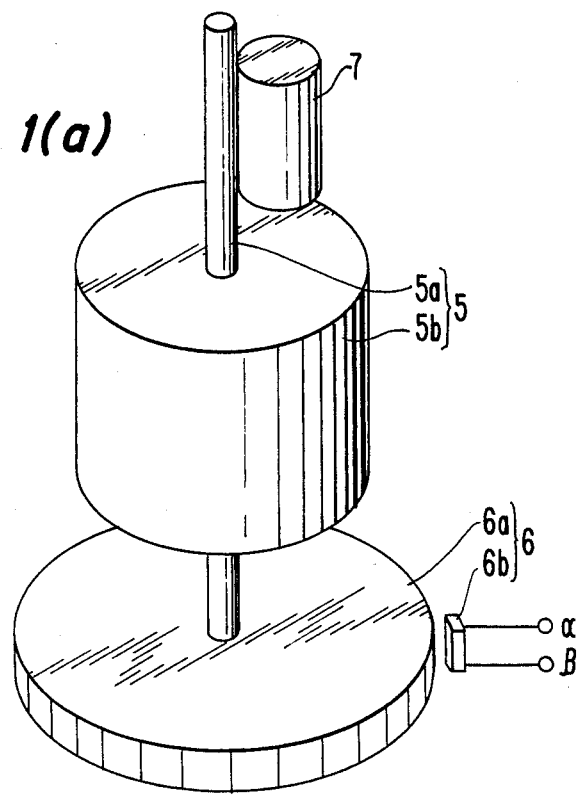
FIG. 1(a) is a structural diagram of a tape transfer component and a transfer amount detection component of the first embodiment.

FIG. 1(a) shows a tape transfer section 5 comprising: a capstan 5a and a capstan motor 5b; a transfer amount detection section 6 comprising an encoder 6a and a detector 6b; and a pinch roller 7.

The capstan 5a composes the rotating shaft of the capstan motor 5b. The capstan 5a is pressed with the freely rotatable pinch roller 7. Because the magnetic tape 3 is pressed against the capstan 5a by the pinch roller 7, the magnetic tape 3 is transferred in its longitudinal direction in accordance with the rotation of the capstan 5a. On the other end of the capstan shaft which is the shaft of the capstan motor 5b is provided the encoder 6a on a disk type whose outer periphery is made of a magnetic substance so that the encoder 6a rotates integrally with the capstan shaft. The magnetic substance along the outer periphery of the encoded 6a is magnetized so that magnetic poles of N and S are alternately arranged at constant intervals in the circumferential direction thereof.

The detector 6b which is arranged at the fixed section opposing to the outer periphery of the encoder 6a is consisted of two magnetism sensing elements The two magnetism sensing elements of the detector 6b are arranged so as to mutually have a deviation of ¼ wave length with respect to the magnetized wave length of the magnetic poles of the encoder 6a. The two magnetism sensing elements of the detector 6b output signals respectively from output terminals α and β. When the capstan 5a rotates in the CW direction, the signal at the terminal α is advanced by 90 degrees from the signal at the terminal β, and when the capstan 5a rotates in the CCW direction, the signal at the terminals o is delayed by 90 degrees from the signal at the terminal β.

Further, the magnetic poles formed on the encoder 6b are formed so that the frequency $f_c$ of the signal detected by the detector $6_b$ will be 2.Z nd (Z is a natural number) during recording when the tape transfer section 5 transfers the magnetic tape at a fixed speed vt.

The magnetic tape 3 supplied from a supply reel 8 through a guide post 9a, the tension post 4c, and guide posts 9b and 9c is caused to contact the rotating drum 1 at an angle of $\theta_w$ (90°), passes through guide posts 9d, 9e, pressed against the capstan 5a by the pinch roller 7, and transferred to a takeup reel, which is not shown, in accordance with the rotation of the capstan motor 5b.

The following briefly describes operations during the recording of a magnetic recording/reproducing apparatus having a tape running system as shown in FIG. 1.

The speed of the capstan motor 5b is controlled to be a fixed speed $n_c$[rps] and the magnetic tape 3 is transferred at a fixed speed Vt by the capstan 5a.

Figure 2:
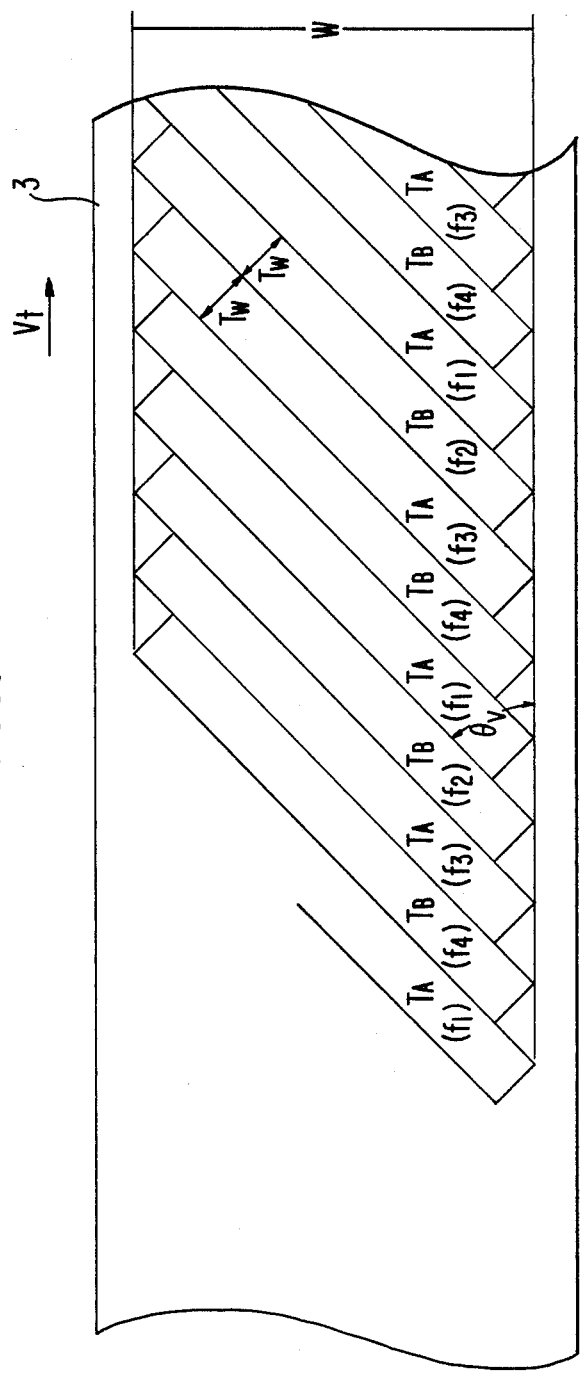
FIG. 2 is a recorded track pattern on a magnetic tape according to the present invention.

Video signals while the drum 1 rotates $\theta_p$ degrees are time-compressed to ½ and the time-compressed video signals are recorded alternately on the magnetic tape by the rotating magnetic heads 2a, 2b. As a result, the recorded tracks $T_A$, $T_B$ having inclinations of $\theta_v$ with respect to the longitudinal direction of the magnetic tape 3 are formed on the magnetic tape 3 as shown in FIG. 2. The relation between the head width $H_w$ and the track width $T_w$ of the tracks $T_A$, $T_B$ is selected based on a condition $H_w > T_w$ so as to realize the same guardbandless bandless azimuth recording as that of the conventional VHS VTR.

Furthermore, as a position signal of each recorded track, four kinds of pilot signals of $f_1 = 6.5f_h$, $f_2 = 7.5f$, $f_3 = 10.5f_h$, $f_4 = 9.5f_h$ (where $f_h$ is a reference frequency) which are sufficiently lower than the frequency band of the video signals to be recorded are recorded sequentially over the video signals to be recorded per track. At this time, the pilot signals having frequencies, $f_1$, $f_3$ are recorded by the rotating magnetic head 2a while the pilot signals having frequencies $f_2$, $f_4$ are recorded by the rotating magnetic head 2b.

Arrangements regarding the tracking during reproduction will hereinafter be described.

Figure 3:
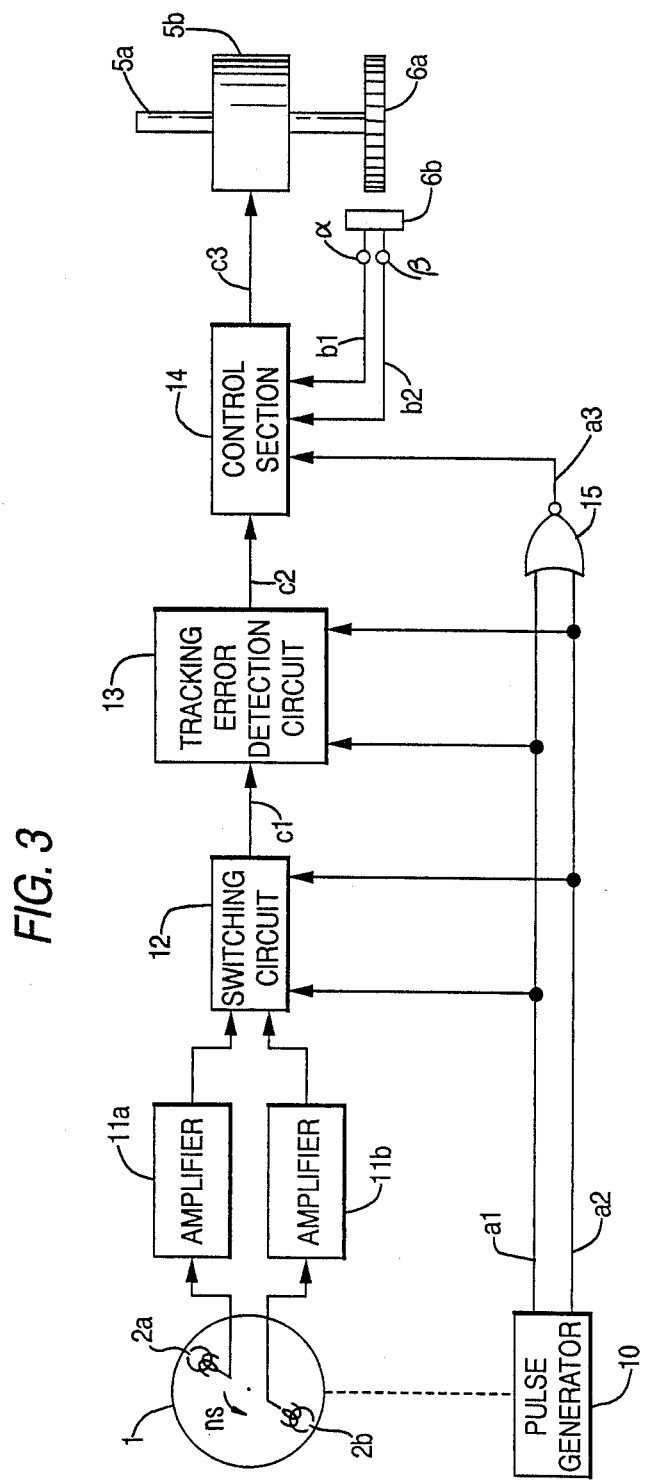
FIG. 3 is a block diagram of essential parts of the first embodiment.

FIG. 3 is a block diagram of essential part of a tracking system in the embodiment shown in FIG. 1. The essential part of FIG. 3 includes a pulse generator 10, amplifiers 11a, 11b a switching circuit 12, a tracking error detection circuit 13, a control section 14, and an OR gate circuit 15.

As shown in the detailed block diagram of FIG. 3(a), the tracking error detection circuit 13 is composed of a low-pass filter (LPF) 13-1, an RS-flip-flop (RS-FF)13-2, a pilot signal generator 13-3, a balanced modulator (BM) 13-4, band-path filters (BPF) 13-5a, 13-5b, rectifier circuits 13-6a, 13-6b, differential amplifiers 13-7a, 13-7b, and a switching circuit 13-8.

As shown in the detailed block diagram of FIG. 3(b), the control section 14 is composed on a rotational direction detector 14-1, an up-down counter 14-2, a pulse generator 14-3, a digital to analog converter (DAC) 14-4, a switching circuit 14-5, and a driving circuit 14-6.

Figure 4:
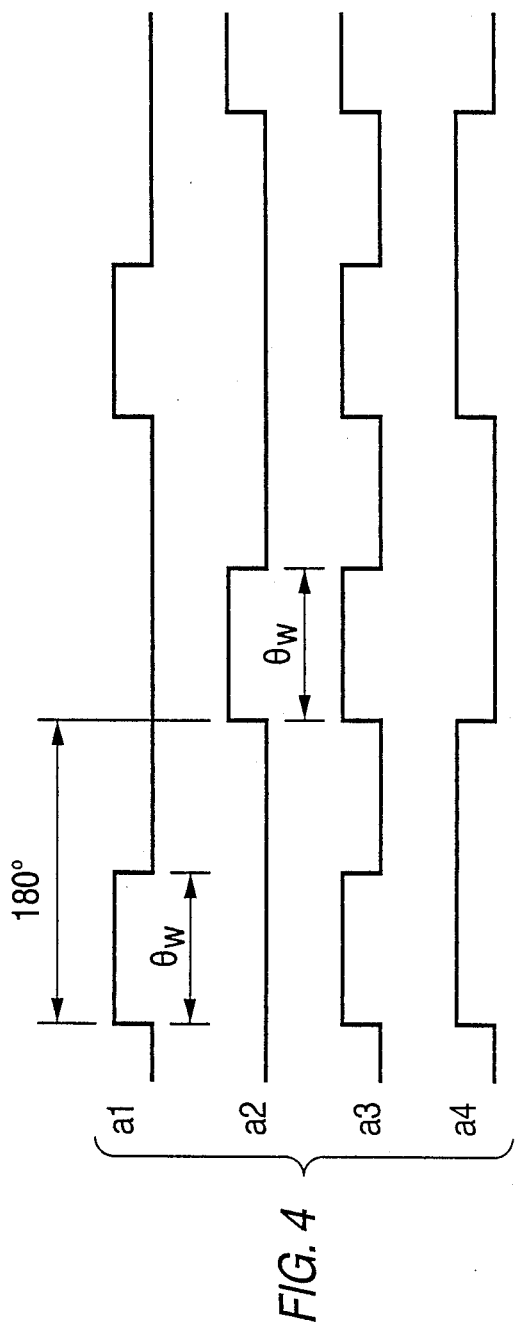
FIG. 4 is a waveform diagram of essential signals in FIG. 2, FIG. 2(a) and FIG. 2(b).

FIG. 4 is a signal waveform diagram of the essential part shown in FIG. 3 and FIG. 3(a). In FIG. 4, signals $a_1$, $a_2$ are output signals of the pulse generator 10, a signal $a_3$ is an output signal of the OR gate 15, and a signal $a_4$ is an output signal of the RS-FF 13-2.

Though not shown in this embodiment, the rotating drum 1 is provided with a drum rotational position detector which outputs a rotational position signal indicating a rotational position of the rotating drum 1. The pulse generator 10 is inputted with the rotational position signal detected by the rotating drum position detector and outputs high level signal $a_1$ during a rotating period of $\theta_w$ degrees when the rotating magnetic head 2a scans over the magnetic tape 3 and a low level signal $a_1$ during the other rotating period, and further outputs a high level signal $a_2$ during a rotating period of $\theta_w$ degrees when the rotating magnetic head 2b scans over the magnetic tape 3 and a low level signal $a_2$ during the other rotating period.

Signals $a_1$, $a_2$ are supplied to the switching circuit 12 as well as to the RS-FF 13-2. The RS-FF 13-2 sets its output to a high level in response to a high level of the signal $a_1$ and outputs the signal $a_4$ which is reset to a low level in response to a high level of the signal $a_2$.

The pilot signal generator 13-3 sequentially outputs the four kinds of pilot signals having the frequencies $f_1$, $f_2$, $f_3$, $f_4$ per half period of the signal $a_4$ and supplies such pilot signal to the BM 13-4. The pilot signals having frequencies $f_1$, $f_3$ are outputted during a period when the signal $a_4$ is at high level, while the pilot signals having frequencies $f_2$, $f_4$ are outputted during a period when the signal $a_4$ is at low level.

The signal reproduced by the rotating magnetic head 2a is amplified by the amplifier 11a and supplied to the switching circuit 12. The signal reproduced by the rotating magnetic head 2b is amplified by the amplifier 11b and supplied to the switching circuit 12. The switching circuit 12, which is responsive to the signals $a_1$ and $a_2$, outputs the reproduced signal which is amplified by the amplifier 11a during a period when the signal $a_1$ is at high level, and outputs the reproduced signal which is amplified by the amplifier 11b during a period when the signal $a_2$ is at high level.

The reproduced signal outputted from the switching circuit 12 is removed of the video signal components by the LPF 13-1. The output signal of the LPF 13-1 is modulated by the BM 13-4 by the output signal of the pilot signal generator 13-3. The BPF 13-5a allows to pass there through only the signal having frequency of $f_h$ from amount the output signals of the BM 13-4. The BPF 13-5b allows to pass there through only the signal having frequency of $3f_h$ from among the output signals of the BM 13-4. The output signal of the BPF 13-5a is detected of its level by the rectifier 13-6a, while the output of the BPF 13-5b is detected of its level by the rectifier 13-6b.

The differential amplifier 13-7a amplifies and outputs the differential voltage between the output voltage of the rectifier 13-6a and the output voltage of the rectifier 13-6b. The differential amplifier 13-7b amplifies and outputs the differential voltage between the output of the rectifier 13-6b and the output voltage of the rectifier 13-6a at the same amplification factor as that of the differential amplifier 13-7a. That is, the outputs of the differential amplifiers 13-7a and 137-b are in an opposite phase relation to each other.

The switching circuit 13-8, which is responsive to the signal $a_4$, selects and outputs as the tracking error signal the output signal of the differential amplifier 13-7a during a period when the signal $a_4$ is at high level and the output signal of the differential amplifier 13-7b during a period when the signal $a_4$ is at low level. The tracking error signal detected by the tracking error detection circuit 13 becomes the signal which corresponds to the positional deviation of the rotating magnetic head with respect to the track recorded on the magnetic tape and has the positional deviation of four track widths ($4T_w$) as one period.

The rotational direction detector 14-1 detects the phase relation of the signals $b_1$, $b_2$ obtained from the output terminals $\alpha$ and $\beta$ of the detector 6b according to the rotation of the capstan 5a thereby to detect the rotational direction of the capstan 5a. That is, the rotational direction detector 14-1 outputs a low level signal when the capstan 5a rotates in the CW direction and the signal $b_1$ is at a phase advanced by 90 degrees with respect to the signal $b_2$ and outputs a high level signal when the capstan 5a rotates in the CCW direction and the signal $b_1$ is at a phase delayed by 90 degrees with respect to the signal $b_2$.

The up-down counter 14-2 is an n bit up-down counter. To the up-down counter 14-2 is inputted the output signal of the rotational direction detector 14-1 and the signal $b_1$. The up-down counter counts down when the output of the rotational direction detector is at low level according to the signal $b_1$ and counts up when the output of the rotational direction detector 14-1 is at high level according to the signal $b_1$. Furthermore, the up-down counter 14-2 is inputted with the present data $D_p (= Z.n_d;$ decimal value conversion) and preset to the preset data by the output pulse of the pulse generator 14-3. The pulse generator 14-3 generates pulses of minute width every time the leading edge of the signal $a_3$ arrives.

The output data of the up-down counter 14-2 is converted into an analog value by the DAC 14-4 and supplied to the switching circuit 14-5. The switching circuit 14-6 selects and outputs the output signal of the DAC 14-4 when the signal $a_3$ is at high level and the output signal of the tracking error detection circuit when the signal $a^3$ is at low level. The driving circuit 14-9 controls the rotation of the capstan motor 5b according to the output of the switching circuit 14-6.

During a period when the rotating magnetic heads 2a, 2b scan over the magnetic tape 3 (during a period when the signal $a_3$ is at high level), by controlling the rotation of the capstan motor according to the output signal of the tracking error detection circuit 14, the control section 14 controls the transfer amount of the magnetic tape 3 so that the tracking error signal to be detected by the tacking error detection circuit 14 becomes zero. As a result of this, the rotating magnetic heads 2a, 2b accurately scan the recorded tracks $T_A$, $T_B$. Further, during a period when the signal $a_3$ is at low level, the control section 14 controls the rotation of the capstan motor 5b so that the output data of the up-down counter 14-2 becomes zero. In other words, the capstan 5a rotates by such an amount as to generate the signal equivalent to the $Z.N_d$ period of the signal $b_1$ to be detected by the detector 6b during a period of the signal $a_3$ period. Therefore, the average transfer speed of the magnetic tape 3 becomes the same as that during recording.

As is apparent from the description of above, according to the embodiment of the present invention, during a period when the rotating magnetic head reproduces the signals recorded on the magnetic tape, the transfer amount of the magnetic tape is controlled so that the rotating magnetic head accurately scans over the recorded tracks according to the tracking error signals, and further the average transfer speed of the magnetic tape is controlled so that it becomes the same speed as that used for recording during a period when the rotating magnetic head does not reproduce the signals recorded on the magnetic tape. Therefore, even if the inclination of the recorded tracks with respect to the longitudinal direction of the magnetic tape is different from $\theta_v$, it is possible to cause the rotating magnetic head to scan over the recorded tracks accurately. Also, the slow speed reproduction or high speed reproduction become possible by changing the preset data $D_p$ of the up-down counter 14-2.

Next, a second embodiment of the present invention will be described.

The same elements used in the second embodiment as those used in the first embodiment are assigned with the same reference numbers and thus the detailed explanation thereof will be omitted.

Figure 5:
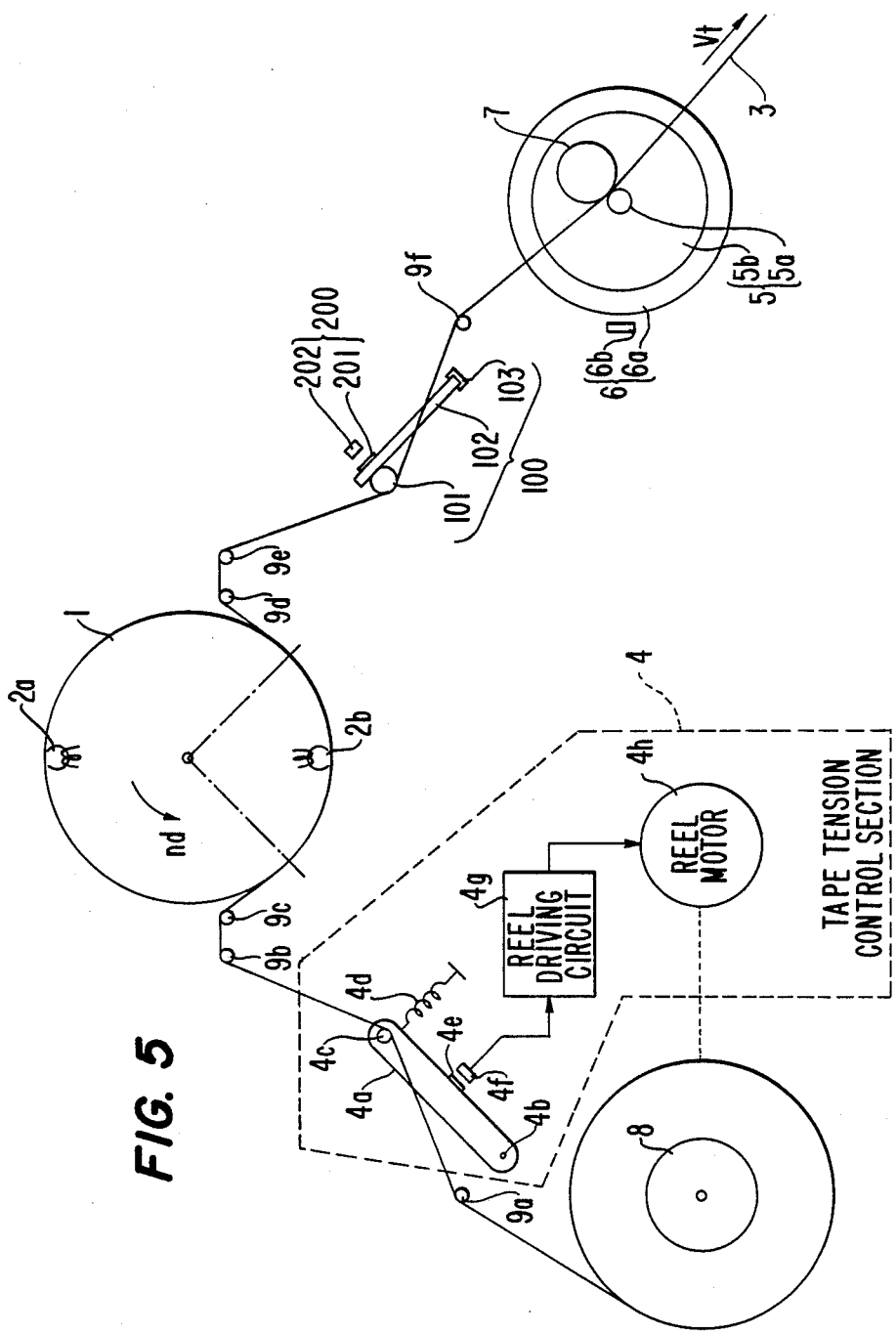
FIG. 5 is a block diagram showing a tape running system of a second embodiment.

FIG. 5 is a schematic block diagram of a tape running system in the second embodiment. In FIG. 5, a post actuator 102 composed as a bimorph piezo-electric element is provided near one end thereof with a tracking post 101 on one major surface and with a magnet 201 on the other major surface. A magnetism sensing element 202 opposing the magnet 201 is arranged at a fixed section. The other end of the post actuator 102 is secured to a fixed section 103 so that the tracking post 101 is so positioned as to contact the magnetic tape 3 between the guide posts 9e and 9f. That is, by displacing the post actuator 102, the length of the magnetic tape between the guide posts 9e and 9f can be changed. Further, the length of the magnetic tape 3 between the guide posts 9e and 9f changed by $\delta L$ [$\mu$m] for each 1 [$\mu$m] deviation of the tracking post position. The magnet 201 and the magnetism sensing element 202 compose a post position detecting section 200 for detecting the position of the tracking post 101. The output voltage of the magnetism sensing element 202 changes by $e_p$ [mV] for each 1 [$\mu$m] deviation of the tracking post 101.

Figure 6:
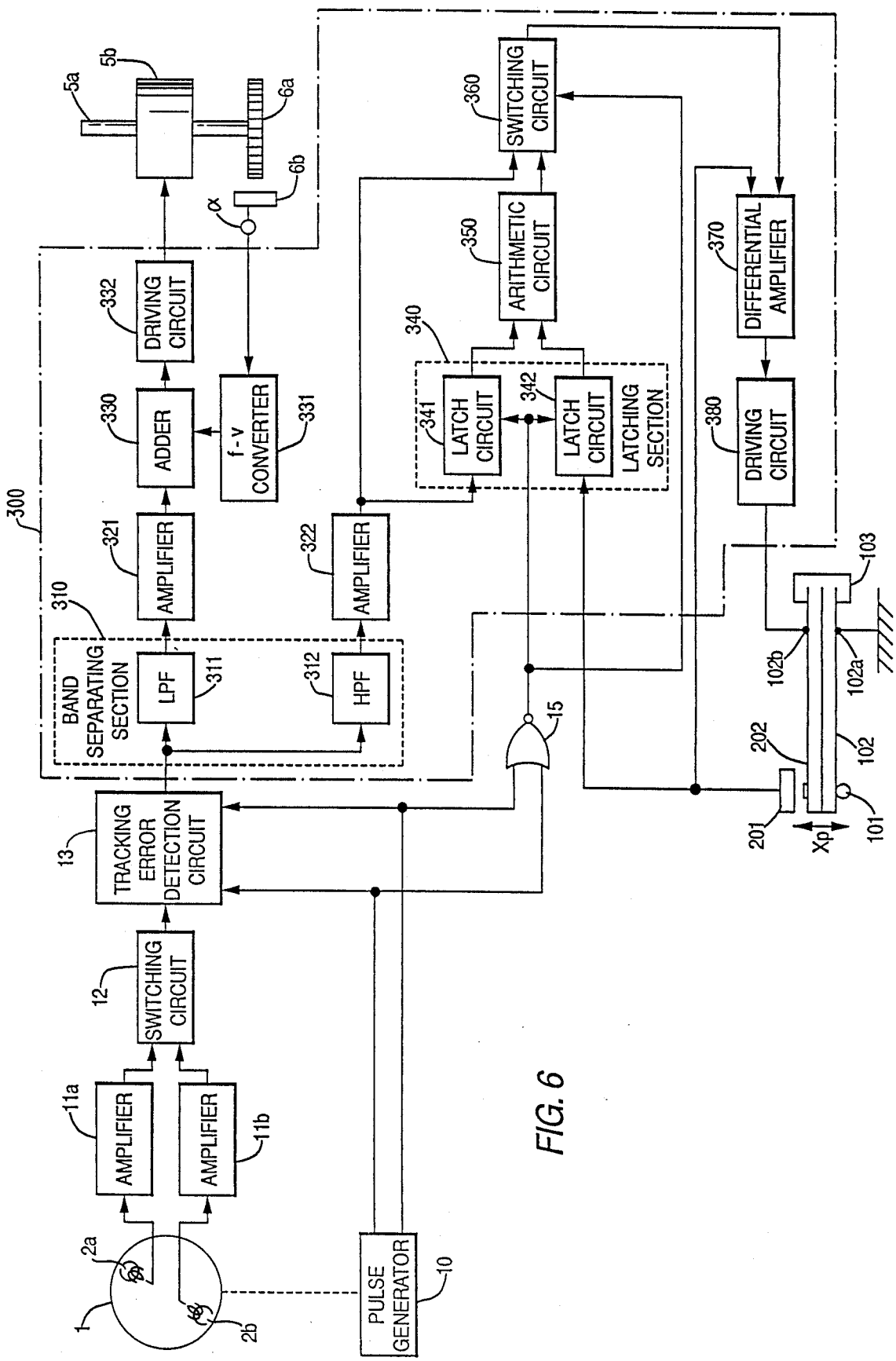
FIG. 6 is a block diagram of essential parts of the second embodiment.

FIG. 6 is a block diagram of essential circuits in the second embodiment. In FIG. 6, the tracking error detection circuit 13 is arranged to output a tracking error signal $e_t$ [mV] per 1 [$\mu$m] positional deviation of the rotating magnetic heads 2a and 2b with respect to the recorded tracks. The output signal of the tracking error detection circuit 13 is separated into a high band frequency component and a low band frequency component by a low-pass filter (LPF) 311 and a high-pass filter (HPF) 312 which compose a hand separating section 310. The separation frequency is sufficiently lower than the number of rotations $n_d$ [rps] of the drum 1. The low frequency component separated by the LPF 311 is amplified by an amplifier 321.

A frequency to voltage (f-v) converter 331 outputs a voltage corresponding to the frequency of the signal detected by the detector 6b. An adder 330 adds the output voltage of the amplifier 321 and the f-v converter 331 and supplies the added output voltage to a driving circuit 332. The driving circuit 332 supplies a power corresponding to the output voltage of the adder 330 to the capstan motor 5b.

An amplifier 322 amplifies the high frequency component separated by the HPF 312 by $e_p/e_t/(\delta L \cdot \sin(\theta_v))$ times. A latch circuit 341 latches the output voltage of the amplifier 332, while a latch circuit 342 latches the output voltage of the magnetism sensing element 201, at a timing which is fractionally delayed than a leading edge of the signal $a_3$ which is the output signal of the OR gate 15. The latch circuits 341, 342 compose a latching section 340. An arithmetic circuit 350 adds the output voltages of the latch circuit 341 and the latch circuit 342.

A switching circuit 360, which is responsive to the signal $a_3$, outputs the output voltage of the amplifier 322 during a period when the signal $a_3$ is at high level, that is, when the rotating magnetic heads 2a, 2b scan over the magnetic tape 3 thereby to reproduce signals, and the output voltage of the arithmetic circuit 350 during a period when the signal $a_3$ is at low level.

A differential amplifier 370 amplifies and outputs a differential voltage between the output voltage of the switching circuit 360 and the output voltage of the magnetism sensing element 201. A driving circuit 380 applies a high voltage corresponding to the output voltage of the differential amplifier 370 to one electrode 102b of the post actuator 102. The other electrode 102a of the post actuator 102 is grounded.

According to the arrangement such as above, the capstan motor 5b is controlled of its speed by the f-v converter 331, added 330, and driving circuit 332 so that the magnetic tape 3 is transferred by the capstan 5a at almost the same speed as that used for recording.

Furthermore, because the capstan motor 5b is controlled of its rotation by the low frequency component of the tracking error signal detected by the tracking error detection circuit 13, the magnetic tape 3 is controlled so that the rotating magnetic heads 2a, 2b averagely scan over the tracks recorded on the magnetic tape 3. Therefore, when a rotating magnetic head scans a recorded track formed at $\theta_v'$ ($\theta_v' \neq \theta_v$) with respect to the longitudinal direction of the magnetic tape, the relation between the recorded track and the rotating magnetic head becomes as shown in FIG. 7.

Figure 7:
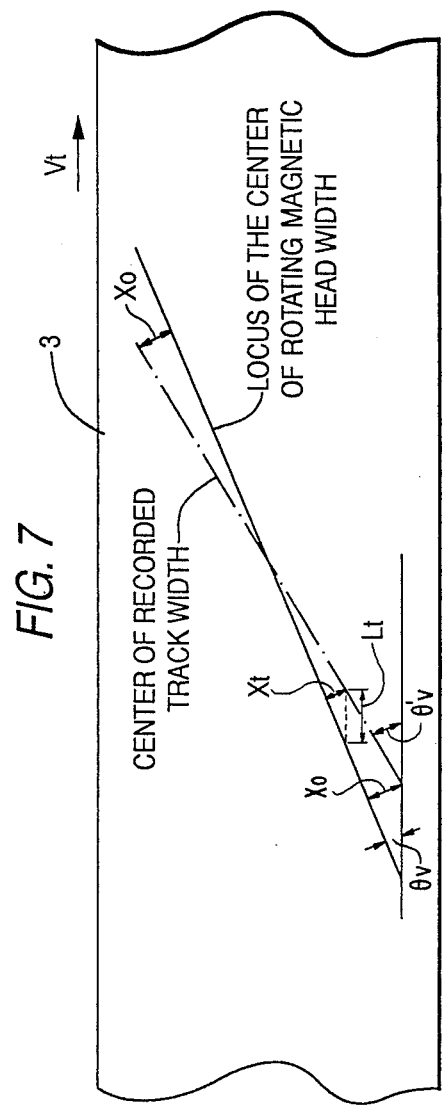
FIG. 7 is a diagram showing a relation of the scanning position of the recorded track and the rotating magnetic head to be provided for the explanation of the second embodiment.

In FIG. 7, the solid line denotes the scanning locus at the center of the width of the rotating magnetic head and the dot-and-dash line denotes the center of the recorded track. That is, because the magnetic tape 3 in this case is transferred by the capstan 5a so that the rotating magnetic heads 2a, 2b scan over the recorded track averagely, the positional deviation $x_t[\mu m]$ of the rotating magnetic head with respect to the direction of the recorded track width changes linearly from $x_o$ to $-x_o$ when the post actuator is not driven. At this time, the tracking error detection circuit 13 outputs a tracking error signal of voltage $Et=e_t\cdot x_t$ for a positional deviation $x_t$. This tracking error signal $E_t$, whose frequency becomes $2n_d$, is inputted through the HPF312 to the amplifier 322 where it is amplified and outputted as a voltage $E_t'$:

$$E_t'=e_p\cdot x_t/(\delta L \sin(\theta_v))$$

The latch circuit 341 latches a voltage $E_{ti}$:

$$E_{ti}=e_p\cdot x_o/(\delta L\cdot\sin(\delta_v))$$

The latch circuit 342 latches an output voltage $E_{pi}$ of the magnetism sensing element 201 in the vicinity of the leading edge of the signal $a_3$. Therefore, the arithmetic circuit 350 outputs a voltage $E_{ti}+E_{pi}$. Thus, when the signal $a_3$ is at high level, the switching circuit 360 passes the output voltage $E_t'$ of the amplifier 341, to that the differential amplifier 370 and the driving circuit 380 drive the post actuator 102 so that the output voltage $E_p$ of the magnetism sensing element becomes equal to $E_t'$. Namely, the equation will be as shown below.

$$E_p=e_p\cdot x_t/(\delta L\cdot\sin(\delta_v))$$

Therefore, the tracking post 101 will be displaced as follows.

$$x_p=E_p/e_p=x_t/(\delta L\cdot\sin(\theta_v))$$

As a result of this, the length of the magnetic tape 3 between the guide posts 9e and 9f is changed by $x_pL=x_t/\sin(\theta_v)$.

Although the tension of the magnetic tape 3 is changed with the change in the magnetic tape length, the tension of the magnetic tape 3 is made to be constant by the tension control section 4, so that the change in the magnetic tape length becomes the change in the longitudinal direction of the magnetic tape 3 on the drum 1. In other words, in terms of the direction of the track width, the change will be $x_t$ so that the rotating magnetic heads 2a, ab accomplishes accurate scanning over the recorded tracks without causing a positional deviation.

Now, if the signal $a_3$ becomes low level, the post actuator 102 is driven so that the output voltage of the magnetism sensing element 201 becomes equal to the output voltage of the arithmetic circuit 350. That is, the output voltage of the magnetism sensing element 201 is expressed by the following.

$$E_p=E_{pi}+e_px_o/(\delta L\cdot\sin(\theta_v))$$

Therefore, the tracking post 101 is controlled to be in a position $E_p/e_p$, that is, $E_{pi}/e_p+x_o/(\delta L\cdot\sin(\theta_v))$ As have been described above, by causing the signal $a_3$ to control the position of the tracking post 101 while the signal $a_3$ is at low level, the deviation of the scanning position of the magnetic head becomes zero with respect to the position of the recorded track when the next rotating magnetic head starts scanning over the recorded track.

By repeating the operation such as above, it becomes possible to cause the rotating magnetic heads 2a, 2b to scan over the recorded track with more accuracy and stability.

What is claimed is:

1. A tracking system for a helical scanning type recording/reproducing apparatus in which a rotating magnetic head arranged on a rotating drum scans over a magnetic tape for an angle $\theta_w$ every time the rotating drum rotates $\theta_p$, where $\theta_2<\theta_p$, so as to record and reproduce signals, comprising:
   a tension control means which controls the tension of said magnetic tape;
   a tape transfer means which transfers said magnetic tape in its longitudinal direction;
   a transfer amount detection means which detects a transfer amount in the longitudinal direction of said magnetic tape;
   a tracking error detection means which detects a positional error of the scanning position of said magnetic head with respect to a recorded track formed on said magnetic tape from the signal reproduced by said rotating magnetic head and outputs a tracking error signal; and
   a control means which controls said tape transfer means according to the tracking error signal so that said rotating magnetic head scans over the recorded track during a first period in which said rotating magnetic head reproduces the signal recorded on said magnetic tape, and controls said tape transfer means by an output of said transfer amount detection means so that the transfer amount of said magnetic tape becomes a specified amount every time said rotating magnetic head rotates $\theta_p$ during a second period other than said first period.

2. A tracking system according to claim 1, wherein the tape transfer means comprises a capstan and a capstan motor which drives the capstan, and the transfer amount detection means includes a frequency generator directly connected to the capstan.

3. A tracking system according to claim 1, wherein the tape transfer means comprises: a first transfer means comprising a capstan and a capstan motor for driving the capstan; and a second transfer means comprising a tracking post which is arranged movably between the rotating drum and the capstan so as to change the length of the magnetic tape extending from the rotating drum to the capstan and a post actuator for driving the tracking post,
   wherein the transfer amount detection means includes a post position detecting means for detecting a position of the tracking post, and
   wherein the control means controls said first transfer means so that the first transfer means transfers the magnetic tape at a fixed speed, controls said second transfer means according to the tracking error signal so that the magnetic head scans over the recorded track during the first period, and controls said second transfer means according to an output of the post position detecting means so that the tracking post is located at a specified position during the second period.

4. A tracking system according to claim 3, wherein the control means includes a band separating means for separating the output signal of the tracking error detection means into a high band frequency signal component and a low band frequency signal component, the first transfer means being controlled by the low band frequency component, and the second transfer means being controlled by the high band frequency component.

5. A tracking system according to claim 4, wherein the control means includes latch means for latching the high band frequency signal of the tracking error signal separated by the band separating means during an initial stage of the first period and the output signal of the transfer amount detection means, and a computing means for computing and outputting a target position toward which the tracking post is caused to move during the second period by said two latched signals so that the second transfer means is driven by the output of said computing means during the second period.

* * * * *